United States Patent
Wong et al.

(10) Patent No.: US 11,076,269 B2
(45) Date of Patent: Jul. 27, 2021

(54) MACHINE TYPE COMMUNICATION USING MOBILE ORIGINATED SHORT MESSAGING SERVICE WITHOUT MOBILE STATION INTERNATIONAL SUBSCRIBER DIRECTORY NUMBER

(71) Applicant: NOKIA SOLUTIONS AND NETWORKS OY, Espoo (FI)

(72) Inventors: Curt Wong, Bellevue, WA (US); Devaki Chandramouli, Plano, TX (US); Ulrich Wiehe, Bad Hersfeld (DE); Raymond Jong-A-Kiem, Lewisville, TX (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 16/315,374

(22) PCT Filed: Jul. 7, 2017

(86) PCT No.: PCT/US2017/041132
§ 371 (c)(1),
(2) Date: Jan. 4, 2019

(87) PCT Pub. No.: WO2018/009821
PCT Pub. Date: Jan. 11, 2018

(65) Prior Publication Data
US 2019/0313216 A1    Oct. 10, 2019

Related U.S. Application Data
(60) Provisional application No. 62/359,508, filed on Jul. 7, 2016.

(51) Int. Cl.
*H04W 4/00* (2018.01)
*H04W 4/14* (2009.01)
(Continued)

(52) U.S. Cl.
CPC ............. *H04W 4/14* (2013.01); *H04L 12/66* (2013.01); *H04L 29/06* (2013.01); *H04L 51/38* (2013.01);
(Continued)

(58) Field of Classification Search
None
See application file for complete search history.

(56) References Cited

U.S. PATENT DOCUMENTS 8,340,288 B2    12/2012  Norrman et al.
9,736,619 B2 *   8/2017  Kim .................. H04L 51/38
(Continued)

FOREIGN PATENT DOCUMENTS

CN    102984677 A    3/2013
CN    103037327 A    4/2013
(Continued)

OTHER PUBLICATIONS

International Search Report and Written Opinion dated Sep. 18, 2017 corresponding to International Patent Application No. PCT/US2017/041132.

(Continued)

*Primary Examiner* — Erika A Washington
(74) *Attorney, Agent, or Firm* — Squire Patton Boggs (US) LLP

(57) ABSTRACT

Various communication systems may benefit from being able to communicate without requiring certain identifiers to be assigned. For example, certain wireless communication systems may benefit from machine type communication using mobile originated short messaging service without a mobile station international subscriber directory number. A method can include preparing, at a user equipment, a mobile originated short message service message. The method can also include identifying, in the message, a particular external (Continued)

identifier from a set of external identifiers assigned to an application.

18 Claims, 5 Drawing Sheets

(51) Int. Cl.
*H04W 4/70* (2018.01)
*H04W 12/04* (2021.01)
*H04L 12/66* (2006.01)
*H04L 12/58* (2006.01)
*H04L 29/06* (2006.01)

(52) U.S. Cl.
CPC ....... *H04W 4/70* (2018.02); *H04W 12/04033* (2019.01)

(56) References Cited

U.S. PATENT DOCUMENTS

| | | | |
|---|---|---|---|
| 2006/0229084 A1 | 10/2006 | Noldus et al. | |
| 2007/0032251 A1 | 2/2007 | Shaheen | |
| 2009/0075684 A1 | 3/2009 | Cheng et al. | |
| 2013/0303206 A1* | 11/2013 | Starsinic | H04W 4/14 455/466 |
| 2013/0310088 A1 | 11/2013 | Wong et al. | |
| 2014/0155112 A1 | 6/2014 | Molnar et al. | |
| 2014/0258434 A1 | 9/2014 | Hong et al. | |
| 2014/0258465 A1 | 9/2014 | Li | |
| 2015/0304796 A1 | 10/2015 | Xu | |
| 2016/0007390 A1* | 1/2016 | Starsinic | H04W 4/70 370/328 |
| 2017/0201871 A1* | 7/2017 | Ryu | H04W 4/12 |

FOREIGN PATENT DOCUMENTS

| | | |
|---|---|---|
| CN | 103534960 A | 1/2014 |
| CN | 104937958 A | 9/2015 |
| RU | 2 365 066 C2 | 9/2007 |
| WO | WO 2009/039064 A1 | 3/2009 |
| WO | WO 2013/032208 A2 | 3/2013 |

OTHER PUBLICATIONS

3GPP TS 23.682 V14.0.0 (Jun. 2016), Technical Specification, 3rd Generation Partnership Project; Technical Specification Group Services and System Aspects; Architecture enhancements to facilitate communications with packet data networks and applications (Release 14), Jun. 2016.

3GPP TS 23.204 V13.1.0 (Jun. 2016), Technical Specification, 3rd Generation Partnership Project; Technical Specification Group Services and System Aspects; Support of Short Message Service (SMS) over generic 3GPP Internet Protocol (IP) access; Stage 2, (Release 13), Jun. 2016.

Mar. 22, 2019 Office Action issued in Vietnamese Patent Application No. 1-2019-00648.

Extended European Search Report corresponding to EP Appln. No. 17824993.4, dated Jan. 2, 2020.

Nokia Siemens Networks et al., "Solution for T5 based device triggering", 3GPP DRAFT; SA WG2 Meeting #92, Jul. 9-13, 2012, Barcelona, Spain, S2-123259, 4 pages.

Japanese Office Action corresponding to JP Appln. No. 2019-500385, dated Jan. 20, 2020.

Russian Office Action dated Oct. 24, 2019 corresponding to Russian Patent Application No. 2019101823/08, and English Translation thereof.

Chinese Office Action issued in corresponding Chinese Patent Application No. 201780042269.8 dated Oct. 12, 2020.

European Office Action issued in corresponding European Patent Application No. 17 824 993.4-1216 dated Nov. 5, 2020.

Thailand Office Action issued in corresponding Thailand Patent Application No. 1901000032 dated Nov. 2, 2020.

Chinese Office Action issued in corresponding Chinese Patent Application No. 2017800422698 dated Mar. 24, 2021.

Indian Office Action issued in corresponding Indian Patent Application No. 201947004083 dated Apr. 13, 2021.

* cited by examiner

MACHINE TYPE COMMUNICATION USING MOBILE ORIGINATED SHORT MESSAGING SERVICE WITHOUT MOBILE STATION INTERNATIONAL SUBSCRIBER DIRECTORY NUMBER

CROSS-REFERENCE TO RELATED APPLICATION

This application is related to and claims the benefit and priority of U.S. Provisional Patent Application No. 62/359,508, filed Jul. 7, 2016, the entirety of which is hereby incorporated herein by reference.

BACKGROUND

Field

Various communication systems may benefit from being able to communicate without requiring certain identifiers to be assigned. For example, certain wireless communication systems may benefit from machine type communication using mobile originated short messaging service without a mobile station international subscriber directory number.

Description of the Related Art

Third generation partnership project (3GPP) has defined machine type communication (MTC) with mobile terminating (MT) short messaging service (SMS) (MT-SMS) since release 11 (Rel-11) without the use of a mobile station telephone number, also known as mobile station international subscriber directory number (MSISDN). This is defined in 3GPP technical specification (TS) 23.682.

The general principle for MTC in Rel-11 is that the 3rd party service application server can ping or send a small amount of data toward the device, such as user equipment (UE), with an operator assigned external identifier (for example, <device_id>@Operator Domain ID) via a standardized interface (for example Tsp) toward operator network. Operator network then translates this external identifier to UE's international mobile subscriber identity (IMSI) and uses MT-SMS to carry the application payload to the UE. If UE needs to respond back to the 3rd party application server then it is expected the UE can establish an internet protocol (IP) connectivity access network (IP-CAN) session directly toward the 3rd party service application server for communication. Therefore, MT-SMS and IP-CAN session establishment was deeming sufficient for MTC in Rel-11.

Mobile originated (MO) SMS without MSISDN was only possible for an IP multimedia subsystem (IMS) UE, which required new IMS UE capabilities, as described in 3GPP TS 23.204). Interworking with UE that does not support MSISDN-less SMS was based on operator implementation. Therefore, there is currently no 3GPP defined standard to allow a serving node to accept and forward MO-SMS from a non IMS UE for which no MSISDN is assigned. Conventionally, it is the serving node that knows the UE's MSISDN from subscription data received from the home subscriber server (HSS). Thus, the UE's serving node inserts the UE's MSISDN into the MO-SMS so the MSISDN can be used as a trusted Id by the receiver of the short message.

SUMMARY

According to a first embodiment, a method can include preparing, at a user equipment, a mobile originated short message service message. The method can also include identifying, in the message, a particular external identifier from a set of external identifiers assigned to an application.

In a variant, the application can include a machine type communication application.

In a variant, the identifying can include setting an application port identifier to a predetermined value.

In a variant, the identifying can include encoding the particular external identifier as part of a payload of the message.

In a variant, the identifying can include encoding an internet protocol address assigned to the user equipment as part of a payload of the message.

In a variant, the identifying can include encoding a shared secret key as part of a payload of the message.

In a variant, the method can further include transmitting the message from the user equipment.

According to a second embodiment, a method can include receiving, at a network element, a mobile originated short message service message. The method can also include determining, from the message, a particular external identifier from a set of external identifiers assigned to an application.

In a variant, the application can include a machine type communication application.

In a variant, the particular external identifier can be determinable from an application port identifier set to a predetermined value.

In a variant, the particular external identifier can be determinable from the particular external identifier being encoded as part of a payload of the message.

In a variant, the particular external identifier can be determinable from an internet protocol address assigned to the user equipment being encoded as part of a payload of the message.

In a variant, the particular external identifier can be determinable from a shared secret key encoded as part of a payload of the message.

In a variant, the method can further include mapping between the external identifier and information in the message using a query.

In a variant, the query can include a home subscriber server query.

In a variant, the method can additionally include forwarding the message based on the particular external identifier.

According to third and fourth embodiments, an apparatus can include means for performing the method according to the first and second embodiments respectively, in any of their variants.

According to fifth and sixth embodiments, an apparatus can include at least one processor and at least one memory and computer program code. The at least one memory and the computer program code can be configured to, with the at least one processor, cause the apparatus at least to perform the method according to the first and second embodiments respectively, in any of their variants.

According to seventh and eighth embodiments, a computer program product may encode instructions for performing a process including the method according to the first and second embodiments respectively, in any of their variants.

According to ninth and tenth embodiments, a non-transitory computer readable medium may encode instructions that, when executed in hardware, perform a process including the method according to the first and second embodiments respectively, in any of their variants.

According to tenth and eleventh embodiments, a system may include at least one apparatus according to the third or fifth embodiments in communication with at least one apparatus according to the fourth or sixth embodiments, respectively in any of their variants.

BRIEF DESCRIPTION OF THE DRAWINGS

For proper understanding of the invention, reference should be made to the accompanying drawings, wherein.

DETAILED DESCRIPTION

In certain cases, the UE may need to send an acknowledgment toward an application server. This acknowledgment may have a small payload. The acknowledgment may be sent after the UE has received the MT-SMS. Establishing an IP-CAN session for sending small payload may be an overkill, as it may create too much network signaling for establishing and tear-down of the IP-CAN session for such a small payload.

In Rel-13, 3GPP has defined MO-SMS from the UE to address such an acknowledgement with small payload situation with a service capability exposure function (SCEF). However, operator may not wish to upgrade their MTC network architecture with such a Rel-13 feature as an SCEF.

An operator may have a very stable/large-scale SMS infrastructure and may want the UE to use MO-SMS for sending acknowledgment towards the application server. However, this may conventionally require a UE to have MSISDN as per the SMS standard/protocol requirements defined in 3GPP TS 23.040.

Certain embodiments may allow a UE, for which no MSISDN is assigned, to send MO-SMS. This MO-SMS can traverse within an operator's domain and be delivered toward a third party application server via Tsp interface. Moreover, the payload coming via Tsp can be trusted by the third party application server. In certain embodiments, the UE's IMSI may or may not be exposed toward an application server. Certain embodiments, however, may provide a way to map IMSI back to an external ID.

Thus, for example, certain embodiments provide the ability to send MO-SMS without MSISDN. Certain embodiments provide alternative identifiers that can be used. Additionally, certain embodiments provide ways to transmit and/or map the MO-SMS without MSISDN, end to end.

Figure 1:
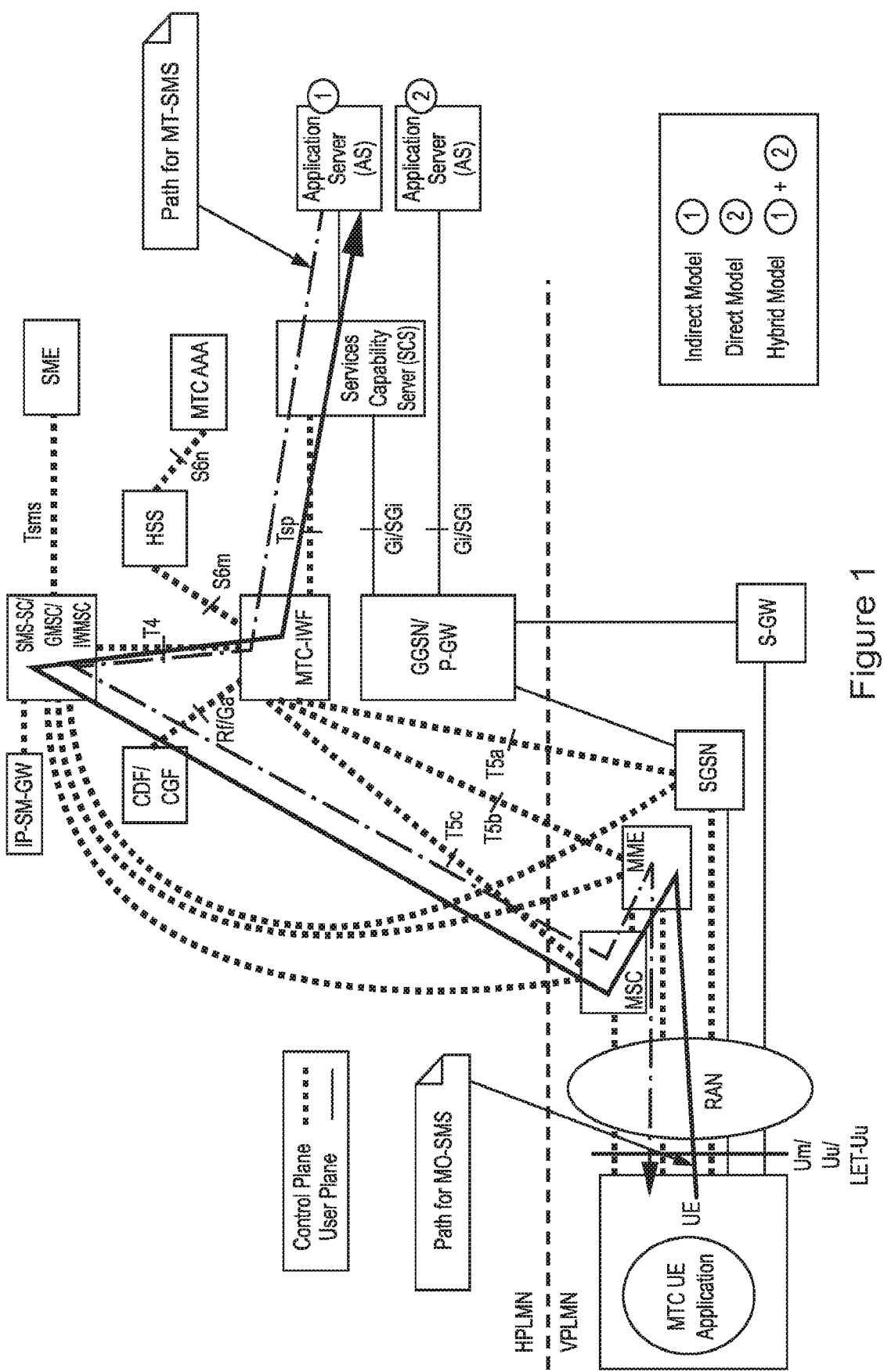
FIG. 1 illustrates an MTC architecture.

FIG. 1 illustrates an MTC architecture. More particularly, FIG. 1 shows the MTC architecture as defined in 3GPP TS 23.682. There are two specially labelled lines: "Path for MT-SMS" and "Path for MO-SMS." The path for MT-SMS shows the signaling path that is involved with an MT-SMS/T4 trigger according to 3GPP TS 23.682. The path for MO-SMS is shown for one of the two approaches discussed below. This path can be similar to the path for an MT-SMS/T4. The MO-SMS signaling path for the other of the two approaches discussed below can bypass the SMS-SC.

Thus, FIG. 1 shows MT-SMS and MO-SMS signaling paths for illustration purposes, with MO-SMS via SMSover-SGs. MO-SMS can also go directly from MME to SMS-SC via SGd, which is not a path shown in FIG. 1.

For MT-SMS, MTC-IWF can perform an HSS query before passing the message on to the SMS-SC. Similarly for a first approach of MO-SMS, the SMS-SC can perform an HSS query before passing the message on to the MTC-IWF. Moreover, in both of the below-described approaches of MO-SMS, the MTC-IWF can perform an HSS query before passing the message on to the SCS.

Figure 2:
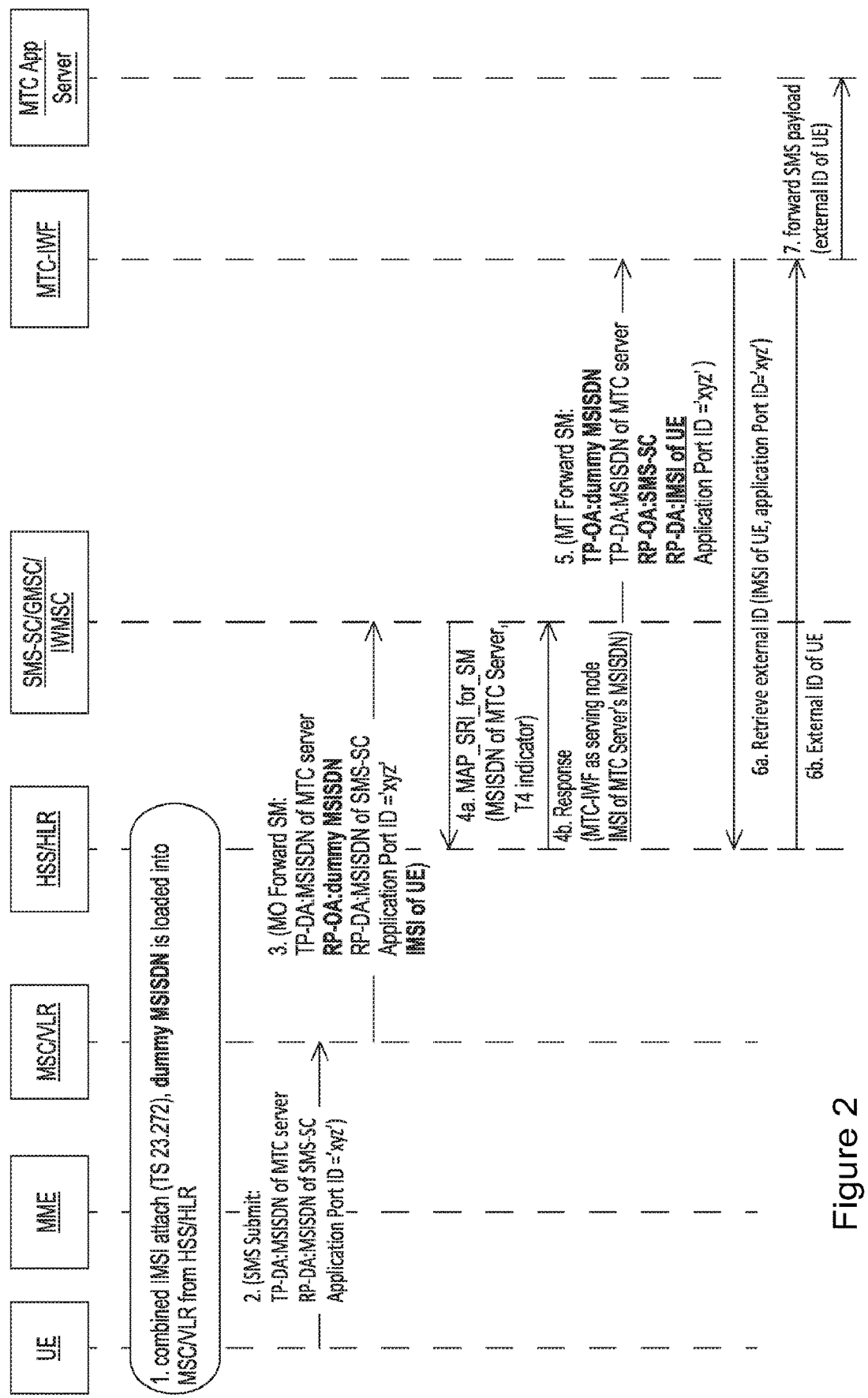
FIG. 2 illustrates MO-SMS via SMS-SC, according to certain embodiments.

FIG. 2 illustrates MO-SMS via SMS-SC, according to certain embodiments. This can be referred to, for convenience, as a first approach. In this first approach, the following are some example procedures that can be carried out, as illustrated in FIG. 2.

As described in 3GPP TS 23.012, section 3.6.1.5, HSS does not contain MSISDN for this UE. The serving node, MSC/visitor location register (VLR) in this case, can then use a dummy MSISDN-value, as configured in the serving node for this UE. Accordingly, the serving node, for example MSC/VLR, can be configured to support MSISDN-less operation. Alternatively, the UE can be assigned with a dummy MSISDN in the subscription record, for example, the HSS/home location register (HLR). All MTC UEs can be assigned with the same dummy MSISDN. This dummy MSISDN can provide backward compatibility in the SMS-MO protocol at the MSC.

The application server can have a real MSISDN assigned, for example in E.164 format. The UE can send MO-SMS toward that number.

If the MTC UE application has been assigned with multiple "external IDs" then the following alternative options can be used by the UE to convey which "external ID" is the sending entity identity.

According to a first option, a UE can set an application port ID in the SMS protocol to a certain standardized value. The range can be up to 255 for 8 bit addressing and can be up to 65535 for 16 bit addressing.

The MTC interworking function (MTC-IWF) can then query the HSS with the IMSI and the received application port address value to obtain the corresponding external ID. This may involve the HSS and UE having the same mapping table. For example, the HSS and UE may have the same mapping between IMSI+application port ID and external ID.

According to a second option the UE can encode the external ID as part of the SMS payload. In this case, it may be up to the application server to determine the sending entity identity by looking into the payload. This option may prevent the network from asserting the UE's identity as in the first option. Thus, this option may involve the network exposing IMSI to an application server in order to make this approach viable.

According to a third option, without IMSI being exposed to application server, the network can indicate to the application server the IP address that has been assigned to the UE. This may involve the UE encoding the UE's own IP address in the SMS payload as well. The application server then can check both IP addresses to determine if the sender carries the assigned IP address to allow some degree of integrity check. However, this option may not work when the UE that does not have an IP address.

According to a fourth option, an application server and the UE can use a shared secret key in the SMS payload to assert the UE sending identity. This can be based on an application level requirement.

The first option is shown by way of an illustration in FIG. 2. The other options may be similarly implemented.

As shown in FIG. 2, at 1, the UE can perform a combined attach procedure in order to send MO SMS via SMS over interface SGs as defined in 3GPP TS 23.272. A dummy MSISDN can be assigned to this UE from a home public land mobile network (HPLMN). This dummy MSISDN can be stored by the VLR.

If MSC/VLR and HSS support MSISDNless operation as defined in 3GPP TS 23.012, section 3.6.1.5, then in such a case the MSC/VLR can assign a dummy MSISDN for this UE.

At 2, the UE can send MO SMS. This message can include the SMS-SC address as a service center address in the SMS submit message. The receiver address can be set to the MSISDN of the MTC Application Server. The UE can indicate the external ID the UE wants to use by setting a corresponding Application port ID value in the Addressing information element of the TP-user data field. For more discussion of the fields of the message see, for example, 3GPP TS 23.040.

At 3, the MSC/VLR can place the dummy MSISDN and the IMSI of the UE as part of a procedure in MAP MO forward SM operation. For more discussion of such a procedure, see 3GPP TS 29.002, for example. The RP-DA can contain the address of the SMS-SC as provided by the UE.

At 4a, the gateway mobile switching center (GMSC) of the SMS-SC can query the HSS/HLR using MSISDN from the TP-DA field, for example MTC App server. A T4 indication can be included. The T4 indicator can ensure that HSS/HLR does not forward the MAP to IP-SM-GW. This can rely on the procedure described in 3GPP TS 29.002. At 4b, the HSS/HLR can return MTC-IWF/SCEF as the serving node. This can be based on HSS/HLR configuration.

Conventional MAP protocol may require HSS/HLR to return IMSI of the MSISDN. However, this IMSI may not be useful as this IMSI may point to the MTC App Server's MSISDN. Therefore, HSS/HLR may assign a dummy IMSI in this MAP protocol.

At 5, the SMS-SC can forward the MT-SMS toward the MTC-IWF/SCEF. MTC-IWF/SCEF address can be received at 4b, as described above. Instead of putting IMSI of MTC Server's MSISDN in the RP-DA field, SMS-SC can put the UE's IMSI in the RP-DA field. As an alternative, SMS-SC may put the UE's IMSI in a new information element field to transfer this data.

SMS-SC can be aware of this special procedure based on any of the following. The IMSI or dummy IMSI returned at 4b can be set to a specific value as an indicator. Alternatively, the dummy MSISDN can be set to a specific value as an indicator. As another alternative, the MSISDN of the MTC server can serve as an indicator. As a further alternative, a new information element (IE) can be provided at 4b by HLR/HSS as an indicator.

At 6, the MTC-IWF/SCEF can use the IMSI of the UE and application port ID to query the HSS/HLR for external ID of the UE. If IMSI can be exposed and external ID is not used, this step can be skipped.

At 7, the MTC-IWF/SCEF can forward the SMS payload to the MTC application server along with the external ID queried from HSS/HLR, or the IMSI if IMSI can be exposed.

Figure 3:
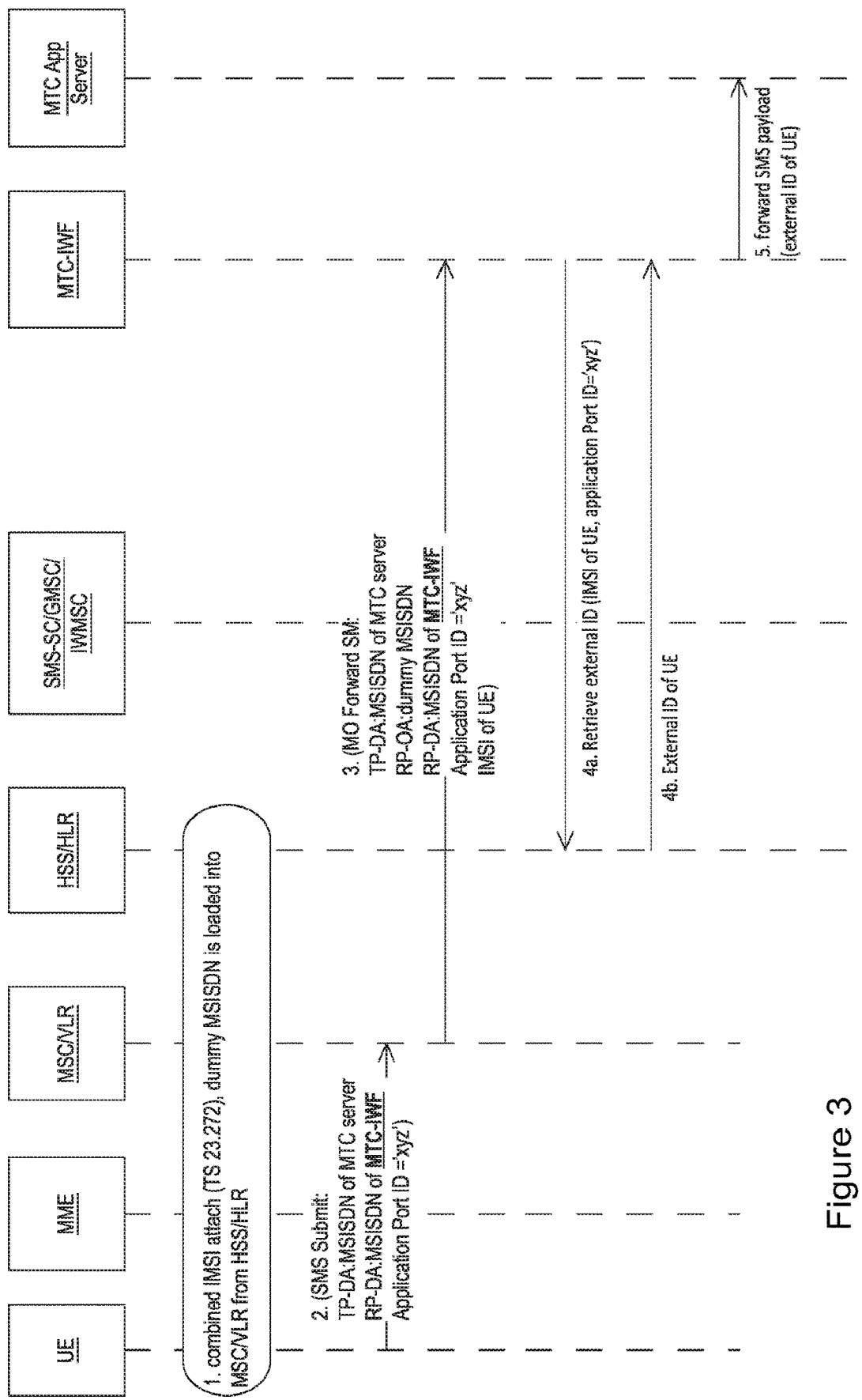
FIG. 3 illustrates MO-SMS directly to MTC-IWF, according to certain embodiments.

FIG. 3 illustrates MO-SMS directly to MTC-IWF, according to certain embodiments. This can be referred to, for convenience, as a second approach. In this second approach, the following are some example procedures that can be carried out, as illustrated in FIG. 3.

This second approach can be viewed as an optimization the above solution by allowing the MO-SMS to bypass SMS-SC. This can be done by configuring the MTC-IWF address as a SMS service center address in the UE.

Many of the features in FIG. 3 are the same as corresponding features in FIG. 2. For example, the features at 1 are the same as at 1 in FIG. 2. Moreover, the features at 4 and 5 in FIG. 3 can be the same as steps 6 and 7 of FIG. 2.

The features at 2 are the same as the features at 2 in FIG. 2, except that the MTC-IWF address, in MSISDN form, can be used as a service center address in the SMS submit message. The features at 3, can be the same as the features at 3 in FIG. 2, except that the RP-DA can contain the address of the MTC-IWF. This address can cause the transport network to route the message directly to MTC-IWF.

The first and second approaches can have various similarities and differences. For example, both approaches can use the application port ID as an additional discriminator to map the IMSI to external ID. As mentioned above, there can be several alternatives to application port ID.

The main difference between the two approaches is in the signaling path used for transmission of SMS message. In the first approach SMS is sent via SMSC and IWF, while in the second approach SMSC is bypassed.

In more detail, in the first approach the MTC-IWF may need to be configured to receive MAP-MT-FSM. By contrast, in the second approach the MTC-IWF may need to be configured to receive or MAP-MO-FSM.

In the first approach the MTC-IWF can be reached using the serving node address returned by HSS. This can be changed in HSS. By contrast, in the second approach the MTC-IWF can be reached using MTC-IWF address being configured to the UE as a service center address. This can be changed by the UE, for example using User Interface MMI.

In the first approach, store and forward, and charging can be done with the SMS-SC, if needed. In the second approach, the SMS-SC does not have a role in MO-SMS and consequently store and forward, and charging may not be able to be done with the SMS-SC as it has no role in MO-SMS In the first approach, the MT and MO paths can be symmetrical. The MO path can have one HSS query while the MT path can have two HSS queries. By contrast, in the second approach, the MT and MO paths may not be symmetrical. However, this asymmetry may save network signaling to the HSS. For example, in the second approach the MT path can proceed from the AS to the SCS to the MTC-IWF (HSS query) to the SMS-SC to the MSC to the MME to the UE. The MO path can go from the UE to the MME to the MSC to the MTC-IWF (HSS query) to the SCS-AS.

The functional impact of the first approach may be bigger than the functional impact of the second approach. For example, certain embodiments may extend MO-FSM with Application Port ID and certain embodiments may utilize an HSS query of external Id with IMSI and Application Port ID.

Figure 4:
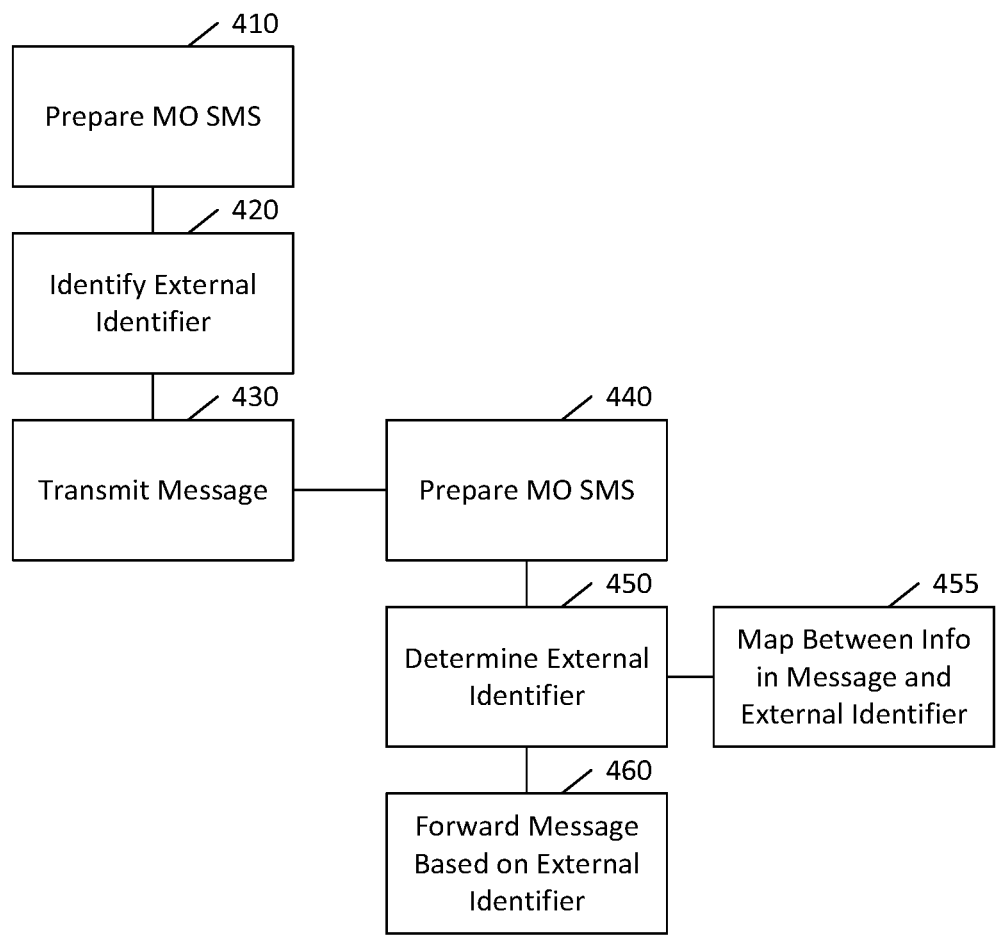
FIG. 4 illustrates a method according to certain embodiments.

FIG. 4 illustrates a method according to certain embodiments. As shown in FIG. 4, a method can include, at 410, preparing, at a user equipment, a mobile originated short message service message. The method can also include, at 420, identifying, in the message, a particular external identifier from a set of external identifiers assigned to an application. The application can be a machine type communication application.

The identifying can include setting an application port identifier to a predetermined value. This or any of the following options may help a receiving network element to identify the external ID corresponding to the sending entity, as mentioned above.

The identifying can include encoding the particular external identifier as part of a payload of the message. Alternatively, or in addition, the identifying can include encoding an internet protocol address assigned to the user equipment as part of a payload of the message. Alternatively, or in addition, the identifying can include encoding a shared secret key as part of a payload of the message.

The method can further include, at 430, transmitting the message from the user equipment. This message may be subsequently received, processed, and forwarded in a network.

The above steps can be performed by a user equipment. The following steps may be performed by a network element, such as an MTC-IWF.

The method can include, at 440, receiving, at a network element, a mobile originated short message service message. This may be the same message sent at 430 or a message based on that message, as variously illustrated in FIGS. 2 and 3.

The method can further include, at 450, determining, from the message, a particular external identifier from a set of external identifiers assigned to an application. As above, the application can be a machine type communication application.

The particular external identifier can be determinable from an application port identifier set to a predetermined value. Alternatively, or in addition, the particular external identifier can be determinable from the particular external identifier being encoded as part of a payload of the message. Alternatively, or in addition, the particular external identifier can be determinable from an internet protocol address assigned to the user equipment being encoded as part of a payload of the message. Alternatively, or in addition, the particular external identifier can be determinable from a shared secret key encoded as part of a payload of the message.

The method can also include, at 455, mapping between the external identifier and information in the message using a query. The query can be a home subscriber server query.

The method can further include, at 460, forwarding the message based on the particular external identifier.

Figure 5:
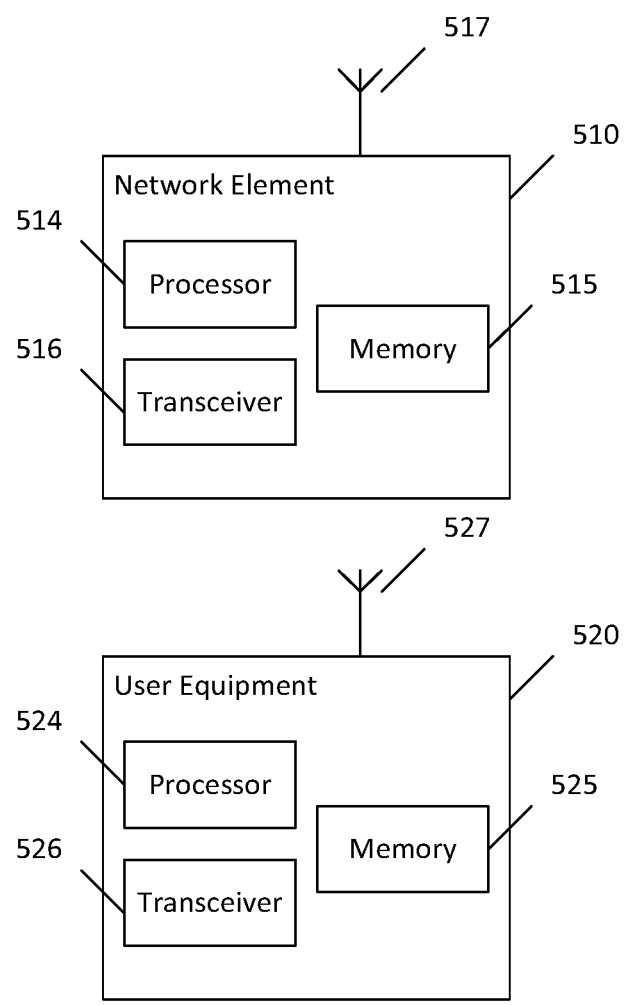
FIG. 5 illustrates a system according to certain embodiments.

FIG. 5 illustrates a system according to certain embodiments of the invention. It should be understood that each block of the flowchart of FIG. 1 may be implemented by various means or their combinations, such as hardware, software, firmware, one or more processors and/or circuitry. In one embodiment, a system may include several devices, such as, for example, network element 510 and user equipment (UE) or user device 520. The system may include more than one UE 520 and more than one network element 510, although only one of each is shown for the purposes of illustration. A network element can be MTC-IWF or any of the other network elements shown or described in reference to any of FIG. 1, 2, or 3.

Each of these devices may include at least one processor or control unit or module, respectively indicated as 514 and 524. At least one memory may be provided in each device, and indicated as 515 and 525, respectively. The memory may include computer program instructions or computer code contained therein, for example for carrying out the embodiments described above. One or more transceiver 516 and 526 may be provided, and each device may also include an antenna, respectively illustrated as 517 and 527. Although only one antenna each is shown, many antennas and multiple antenna elements may be provided to each of the devices. Other configurations of these devices, for example, may be provided. For example, network element 510 and UE 520 may be additionally or solely configured for wired communication, and in such a case antennas 517 and 527 may illustrate any form of communication hardware, without being limited to merely an antenna.

Transceivers 516 and 526 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. It should also be appreciated that according to the "liquid" or flexible radio concept, the operations and functionalities may be performed in different entities, such as nodes, hosts or servers, in a flexible manner. In other words, division of labor may vary case by case. One possible use is to make a network element to deliver local content. One or more functionalities may also be implemented as a virtual application that is provided as software that can run on a server.

A user device or user equipment 520 may be a mobile station (MS) such as a mobile phone or smart phone or multimedia device, a computer, such as a tablet, provided with wireless communication capabilities, personal data or digital assistant (PDA) provided with wireless communication capabilities, portable media player, vehicle, digital camera, pocket video camera, navigation unit provided with wireless communication capabilities or any combinations thereof. The user device or user equipment 520 may be a sensor or smart meter, or other device that may usually be configured for a single location. The user equipment 520 may be a machine primarily configured to send MTC messages.

In an exemplifying embodiment, an apparatus, such as a node or user device, may include means for carrying out embodiments described above in relation to FIG. 4.

Processors 514 and 524 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors. Additionally, the processors may be implemented as a pool of processors in a local configuration, in a cloud configuration, or in a combination thereof.

For firmware or software, the implementation may include modules or units of at least one chip set (e.g., procedures, functions, and so on). Memories 515 and 525 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network element 510 and/or UE 520, to perform any of the processes described above (see, for example, FIGS. 2-4). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments of the invention may be performed entirely in hardware.

Furthermore, although FIG. 5 illustrates a system including a network element 510 and a UE 520, embodiments of the invention may be applicable to other configurations, and configurations involving additional elements, as illustrated and discussed herein. For example, multiple user equipment devices and multiple network elements may be present, or other nodes providing similar functionality.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method, comprising:
preparing, at a user equipment, a mobile originated short message service message; and
identifying, in the message, a particular external identifier from a set of external identifiers assigned to an application, wherein the identifying comprises setting an application port identifier to a predetermined value.

2. The method of claim 1, wherein the application comprises a machine type communication application.

3. The method of claim 1, wherein the identifying comprises encoding the particular external identifier as part of a payload of the message.

4. The method of claim 1, wherein the identifying comprises encoding an internet protocol address assigned to the user equipment as part of a payload of the message.

5. The method of claim 1, wherein the identifying comprises encoding a shared secret key as part of a payload of the message.

6. The method of claim 1, further comprising:
transmitting the message from the user equipment.

7. A computer program product embodied on a non-transitory computer-readable medium, said medium encoding instructions that, when executed on a computer, cause the computer to perform the method according to claim 1.

8. A method, comprising:
receiving, at a network element, a mobile originated short message service message; and
determining, from the message, a particular external identifier from a set of external identifiers assigned to an application, wherein the particular external identifier is determinable from an application port identifier set to a predetermined value.

9. The method of claim 8, wherein the application comprises a machine type communication application.

10. The method of claim 8, wherein the particular external identifier is determinable from the particular external identifier being encoded as part of a payload of the message.

11. The method of claim 8, wherein the particular external identifier is determinable from an internet protocol address assigned to the user equipment being encoded as part of a payload of the message.

12. The method of claim 8, wherein the particular external identifier is determinable from a shared secret key encoded as part of a payload of the message.

13. The method of claim 8, further comprising:
mapping between the external identifier and information in the message using a query.

14. The method of claim 8, wherein the query comprises a home subscriber server query.

15. The method of claim 8, further comprising:
forwarding the message based on the particular external identifier.

16. An apparatus, comprising:
at least one processor; and
at least one memory including computer program code;
the at least one memory and the computer program code configured to, with the at least one processor, cause the apparatus at least to perform the method of claim 8.

17. An apparatus, comprising:
at least one processor; and
at least one memory including computer program code;
the at least one memory and the computer program code configured to, with the at least one processor, cause the apparatus at least to perform a process, comprising:
preparing, at a user equipment, a mobile originated short message service message; and
identifying, in the message, a particular external identifier from a set of external identifiers assigned to an application, wherein the identifying comprises setting an application port identifier to a predetermined value.

18. The apparatus according to claim 16, wherein the application comprises a machine type communication application.

* * * * *